(12) United States Patent
Nagahama et al.

(10) Patent No.: US 8,258,448 B2
(45) Date of Patent: Sep. 4, 2012

(54) AUTOFOCUS DEVICE WITH CONTRAST ENHANCEMENT

(75) Inventors: Tatsuya Nagahama, Kawasaki (JP);
Kenji Okabe, Kawasaki (JP); Sadayuki Matsumiya, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 360 days.

(21) Appl. No.: 12/626,082

(22) Filed: Nov. 25, 2009

(65) Prior Publication Data

US 2010/0133417 A1    Jun. 3, 2010

(30) Foreign Application Priority Data

Nov. 28, 2008   (JP) .................................. 2008-304779

(51) Int. Cl.
*G02B 7/04*   (2006.01)
*G06M 7/00*   (2006.01)
(52) U.S. Cl. ..................................... 250/201.2; 250/221
(58) Field of Classification Search .................. 250/221, 250/201.1–201.9, 559.04, 559.05, 559.07, 250/559.08, 216; 359/382, 383; 348/345–357; 396/79, 72, 80, 82

See application file for complete search history.

(56) References Cited

U.S. PATENT DOCUMENTS 5,710,662 A * 1/1998 Nishida ......................... 359/368
6,091,075 A * 7/2000 Shibata et al. ............ 250/559.44

FOREIGN PATENT DOCUMENTS

JP    08-75980    * 3/1996
JP    2004-029069    1/2004

* cited by examiner

*Primary Examiner* — Francis M Legasse, Jr.
*Assistant Examiner* — Pascal M. Bui-Pho
(74) *Attorney, Agent, or Firm* — Rankin, Hill & Clark LLP

(57) ABSTRACT

An autofocus device includes an objective lens, an observation optical system, a driving mechanism that displaces the objective lens in an optical axis direction thereof, an illumination-optical-system optical path used to illuminate a measurement surface of a measurement object through the objective lens with light, and a pattern-projection-optical-system optical path. An electronic control shutter, a pattern projection plate having a predetermined pattern formed thereon, and a projection lens are provided in the pattern-projection-optical-system optical path.

2 Claims, 5 Drawing Sheets

AUTOFOCUS DEVICE WITH CONTRAST ENHANCEMENT

BACKGROUND OF THE INVENTION

1. Field of the Invention

Provided herein is an autofocus device that moves an objective lens so that the objective lens is focused at a measurement surface of a measurement object at all times on the basis of the contrast of an image of the measurement object. For example, the autofocus device can be used in an optical measuring device, such as an image measuring device or a microscope, which measures the dimensions and shape of the measurement object while an image of the measurement object is observed with an observation optical system.

2. Description of Related Art

Hitherto, in an optical measuring device, such as an image measuring device or a microscope, an autofocus device that performs focusing a pattern projected on a surface of a measurement object is used. For example, as shown in FIG. 5, an autofocus device discussed in Japanese Unexamined Patent Application Publication No. 2004-29069 includes a light source 1, a projection lens 2, a pattern projection plate 3 ("Pattern Proj. Plate" in FIG. 5), and an advance/retreat mechanism 4 ("A/R Mechanism" in FIG. 5). The pattern projection plate 3 is inserted between the light source 1 and the projection lens 2, and has a predetermined pattern (such as a triangular pattern) formed thereon. The advance/retreat mechanism 4 causes the pattern projection plate 3 to advance into or retreat from an optical path. The advance/retreat mechanism 4 includes a spring and a solenoid. The spring performs a biasing operation so that the pattern projection plate 3 advances into the optical path along a guide mechanism. The solenoid opposes the biasing force of the spring and causes the pattern projection plate 3 to retreat from the optical path. Reference numeral 5 denotes an objective lens, reference numeral 6 denotes a beam splitter, reference numeral 7 denotes a tube lens, and reference numeral 8 denotes a CCD camera.

Therefore, for example, when a material having low contrast, such as a mirror surface or a glass surface, is measured, if the pattern projection plate 3 advances into the optical path, the pattern on the pattern projection plate 3 is projected onto a measurement surface of a measurement object. Therefore, it is possible to perform focusing from the contrast of the pattern. When it is not necessary to project the pattern, if the solenoid is excited, it is possible to retreat the pattern projection plate from the optical path.

However, in the related autofocus device, when a pattern is projected or is not projected, the pattern projection plate is caused to advance into the optical path or retreat from the optical path due to biasing force of the spring or excitation or disexcitation of the solenoid. Therefore, for example, throughput is reduced, the noise generated when performing a switching operation is loud, and the life of the device is relatively short.

SUMMARY OF THE INVENTION

Accordingly, it is an object of the present invention to overcome the aforementioned problems and to provide an autofocus device that can overcome the problem related to throughput, the problem related to noise that is generated when performing a switching operation, and the problem related to the length of life of the device.

Accordingly, provided herein is an autofocus device including an objective lens that converges light at a measurement surface of a measurement object; an observation optical system capable of observing an image of the measurement object based on the light from the objective lens; a driving mechanism that displaces the objective lens in an optical axis direction thereof on the basis of a contrast of the image of the measurement object obtained at the observation optical system; an illumination-optical-system optical path used to illuminate the measurement surface of the measurement object through the objective lens with the light; and a pattern-projection-optical-system optical path. In the autofocus device, a pattern projection plate, having a predetermined pattern formed thereon, a projection lens, and a shutter are provided in the pattern-projection-optical-system optical path.

Here, in addition to a mechanical shutter, the shutter refers to, for example, a liquid crystal plate that can switch to a state in which light can be transmitted or intercepted due to application of current or non-application of current. The mechanical shutter is desirably one having a structure that can be opened and closed by electronic control.

According to such a structure, since a predetermined pattern can be projected onto the measurement surface of the measurement object by using the pattern-projection-optical-system optical path, it is possible to perform focusing by displacing the objective lens in the axial direction from the contrast of the pattern. Therefore, it is possible to perform the focusing even if a material having relatively low contrast, such as a mirror surface or a glass surface, is used.

According to an aspect of the autofocus device, a pattern projection plate having a predetermined pattern formed thereon, a projection lens, and a shutter are provided in the pattern-projection-optical-system optical path, and projection of the pattern of the pattern projection plate is performed or is not performed by the shutter. Therefore, compared to the related structure in which the pattern projection plate is driven so as to advance or retreat by, for example, the solenoid and the spring, the throughput can be increased, the noise that is generated when performing a switching operation can be minimized, and life can be increased.

According to another aspect of the autofocus device, the device may further include a light source; light dividing means for dividing light from the light source into light that takes the illumination-optical-system optical path and light that takes the pattern-projection-optical-system optical path; and light synthesizing means for synthesizing the light from the pattern-projection-optical-system optical path with the light of the illumination-optical-system optical path.

According to such a structure, the light dividing means divides the light from the light source into light that takes the illumination-optical-system optical path and light that takes the pattern-projection-optical-system optical path. Therefore, only one light source is used, which contributes to reducing the number of parts and costs. Further, the light from the pattern-projection-optical-system optical path is synthesized with the light of the illumination-optical-system optical path. Therefore, compared to the structure in which the light from the pattern-projection-optical-system optical path and the light from the illumination-optical-system optical path are separately incident upon the objective lens, the structure of the device can be simplified.

According to another aspect of the autofocus device, the shutter may be provided in the illumination-optical-system optical path divided by the light dividing means. According to such a structure, since a shutter is also provided in the illumination-optical-system optical path, it is possible to intercept illumination light when the pattern is projected. Therefore, when the pattern is projected, it is possible to obtain the pattern having high contrast, and to achieve focusing with high precision.

According to another aspect of the autofocus device, the light dividing means may include a plurality of light dividing optical elements that divide the light from the light source into the light that takes the illumination-optical-system optical path and lights that take a plurality of the pattern-projection-optical-system optical paths; and a plurality of the pattern projection plates, having different patterns formed thereon, and a plurality of the shutters may be provided in the plurality of the pattern-projection-optical-system optical paths. According to such a structure, a plurality of pattern-projection-optical-system optical paths are provided, and pattern projection plates having different patterns formed thereon and shutters are provided in the respective pattern-projection-optical-system optical paths. Therefore, it is possible to select the pattern projection plate having the optimal pattern in accordance with the material and a surface state of the measurement object.

Any patterns may be used for the patterns formed on the pattern projection plates as long as they allow detection of an edge. However, it is desirable that the patterns be, for example, triangular patterns, oblique lattice patterns, or wavy patterns. In these cases, even if an edge of the measurement object has a directional property, the edge is there. That is, the edge is not hidden by any of these patterns. Therefore, stable focusing can be performed.

DETAILED DESCRIPTION OF THE PREFERRED EMBODIMENTS

Figure 1:
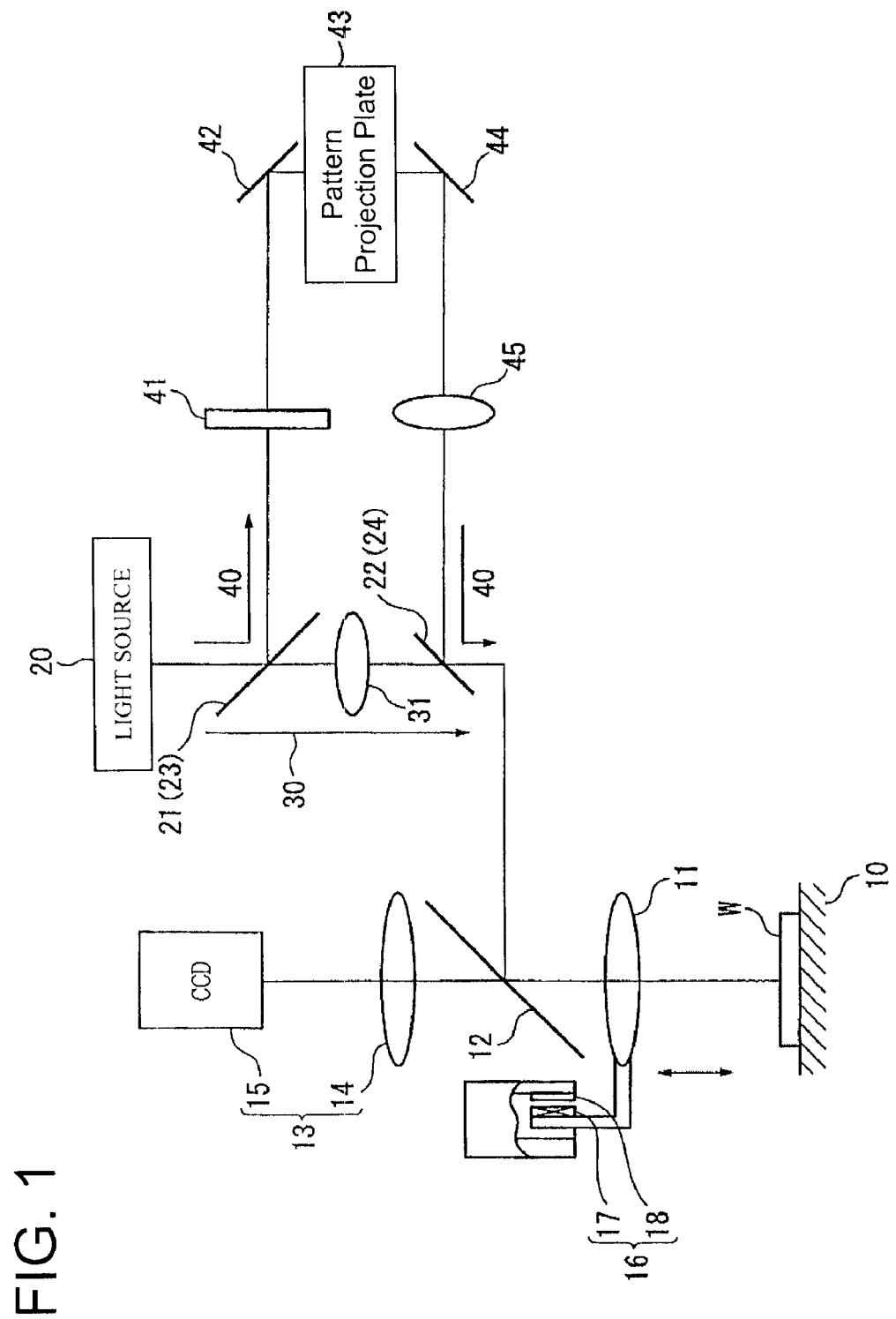
FIG. 1 is an optical system structural view showing an image measuring device according to a first embodiment.

Embodiments of an autofocus device will hereunder be described in detail with reference to the drawings. In the description of the embodiments, corresponding parts having the same structural features or the same functions will be given the same reference numerals, and descriptions of the corresponding parts will not be repeated or will be simplified.

Figure 2:
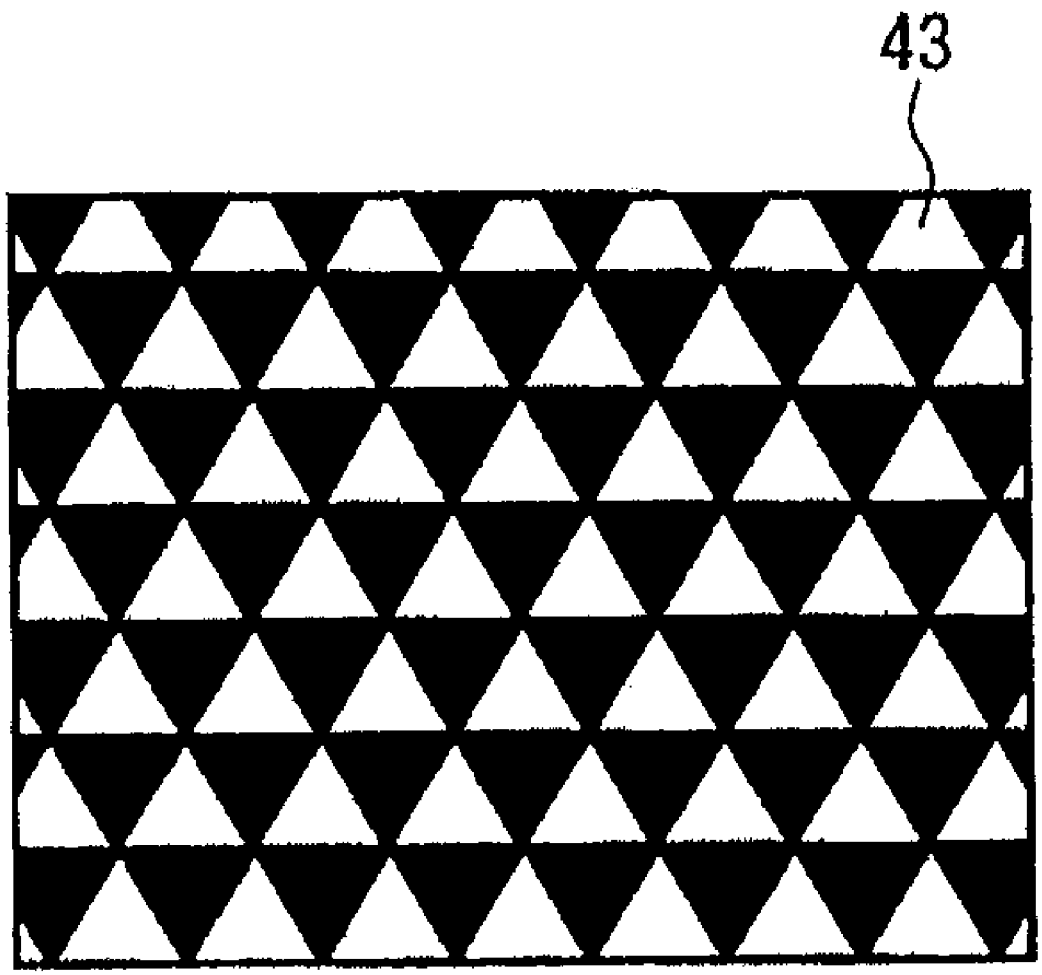
FIG. 2 shows exemplary patterns of a pattern projection plate in the first embodiment.

FIGS. 1 and 2 are optical system structural views showing an image measuring device according to a first embodiment.

As shown in FIG. 1, the image measuring device according to the first embodiment includes a table 10, an objective lens 11, a first beam splitter 12, an observation optical system 13, a driving mechanism 16, a light source 20, light dividing means 21, and light synthesizing means 22. The table 10 has a measurement object W placed thereon. The objective lens 11 converges light at a measurement surface of the measurement object W. The first beam splitter 12 is disposed on the optical axis of the objective lens 11. The observation optical system 13 is capable of observing an image of the measurement object W based on light transmitted through the first beam splitter 12. The driving mechanism 16 displaces the objective lens 11 in an optical axis direction thereof on the basis of the contrast of the image of the measurement object obtained at the observation optical system 13. The light dividing means 21 divides light from the light source 20 into light that takes an illumination-optical-system optical path 30 and light that takes a pattern-projection-optical-system optical path 40. The light synthesizing means 22 synthesizes the light from the pattern-projection-optical-system optical path 40 with the light of the illumination-optical-system optical path 30. The table 10 is formed so as to be movable in an X-axis direction (left-right direction in FIG. 1) and a Y-axis direction (direction orthogonal to the sheet plane of FIG. 1).

The observation optical system 13 includes a tube lens 14 and a CCD camera 15. The tube lens 14 has a predetermined magnification and is disposed on the optical axis of the objective lens 11. The CCD camera 15 picks up an image enlarged or contracted to a predetermined magnification by the tube lens 14.

The driving mechanism 16 displaces the objective lens 11 in the optical axis direction so that the focal point of the objective lens 11 is positioned at the measurement surface of the measurement object W. The driving mechanism 16 includes, for example, a coil 17 and a magnet 18. The coil 17 is provided at a lens holder that holds the objective lens 11. The magnet 18 is fixed to a stationary member at a side of a device body so as to face the coil 17.

The light source 20 includes, for example, a light-emitting diode (LED), but is not limited thereto. The light dividing means 21 and the light synthesizing means 22 include second and third beam splitters 23 and 24, respectively.

The illumination-optical-system optical path 30 is a path extending from the second beam splitter 23 (forming the light dividing means 21) to the first beam splitter 12. In this optical path, an illumination lens 31 and the third beam splitter 24 (forming the light synthesizing means 22) are inserted and disposed in that order from the second beam splitter 23 towards the first beam splitter 12. These constitute an illumination optical system.

The pattern-projection-optical-system optical path 40 is a path extending from the second beam splitter 23 (forming the light dividing means 21) to the third beam splitter 24 (forming the light synthesizing means 22). In this optical path, an electronic control shutter 41, a first mirror 42, a pattern projection plate 43 ("Pattern Proj. Plate" in figures), a second mirror 44, and a projection lens 45 are inserted and disposed in that order from the second beam splitter 23 towards the third beam splitter 24. These constitute a pattern projection optical system.

The electronic control shutter 41 has a structure in which a plurality of blades are combined with each other in a circular shape and in which these blades are opened or closed by a driving source. That is, the electronic control shutter 41 has a structure in which, when a shutter opening/closing command is given, the driving source is driven, thereby opening or closing the plurality of blades.

As shown in FIG. 2, the pattern projection plate 43 has a plurality of triangular patterns that transmit light and a plurality of triangular patterns that intercept light disposed adjacent to each other, with the triangular patterns that are adjacent to each other being disposed so as to face opposite directions. The pattern projection plate 43 can be produced with high definition by a general processing technology including, for example, electronic beam printing, transfer, etching, and cutting with a dicing saw.

In the above-described structure, in performing measurement, when light is emitted from the light source 20, the light is split by the second beam splitter 23 into light that takes the illumination-optical-system optical path 30 and light that takes the pattern-projection-optical-system optical path 40.

The light divided at the illumination-optical-system optical path 30 is incident upon the objective lens 11 through the illumination lens 31, the third beam splitter 24, and the first beam splitter 12, and illuminates the measurement surface of the measurement object W. Light reflected from the measurement surface of the measurement object W passes through the objective lens 11 and the first beam splitter 12. Then, after being enlarged or contracted to the magnification of the tube lens 14, an image is formed on the CCD camera 15.

When a contrast value of each pixel picked up by the CCD camera 15 is determined, and the contrast value is low, the electronic control shutter 41 is opened. This causes the light divided at the pattern-projection-optical-system optical path 40 to pass through the electronic control shutter 41 and to be reflected by the first mirror 42. Then, the reflected light is incident upon the pattern projection plate 43. The triangular patterns of the pattern projection plate 43 are projected onto the measurement surface of the measurement object W through the second mirror 44, the projection lens 45, the third beam splitter 24, the first beam splitter 12, and the objective lens 11. The driving mechanism 16 is driven on the basis of the contrast value of each pixel picked up by the CCD camera 15, the objective lens 11 is displaced towards the optical axis direction, and focusing is performed.

After the objective lens 11 is focused, the electronic control shutter 41 is closed. This causes the light divided at the pattern-projection-optical-system optical path 40 to be intercepted, as a result of which the triangular patterns of the pattern projection plate 43 are no longer projected onto the measurement surface of the measurement object W. In this state, the dimensions and shape of the measurement object W can be measured from the image of the measurement object W picked by the CCD camera 15.

According to the first embodiment, the illumination-optical-system optical path 30 and the pattern-projection-optical-system optical path 40 are provided. In addition, the electronic control shutter 41, the pattern projection plate 43 having predetermined patterns formed thereon, and the projection lens 45 are provided in the pattern-projection-optical-system optical path 40. Further, pattern projection of the pattern projection plate 43 is allowed or not allowed by the electronic control shutter 41. Therefore, compared to the related structure in which the pattern projection plate is driven so as to advance or retreat by, for example, a solenoid or a spring, throughput can be increased; noise generated during switching can be minimized; and life can be increased.

By the second beam splitter 23 forming the light dividing means 21, the light from the light source 20 is divided into light that takes the illumination-optical-system optical path 30 and light that takes the pattern-projection-optical-system optical path 40. Therefore, only one light source is required, making it possible to reduce the number of parts and costs.

Further, by the third beam splitter 24 forming the light synthesizing means 22, the light from the pattern-projection-optical-system optical path 40 is synthesized with the light of the illumination-optical-system optical path 30. Therefore, compared to the structure in which the light from the pattern-projection-optical-system optical path 40 and the light of the illumination-optical-system optical path 30 are separately incident upon the objective lens 11, the structure of the device can be simplified.

Figure 3:
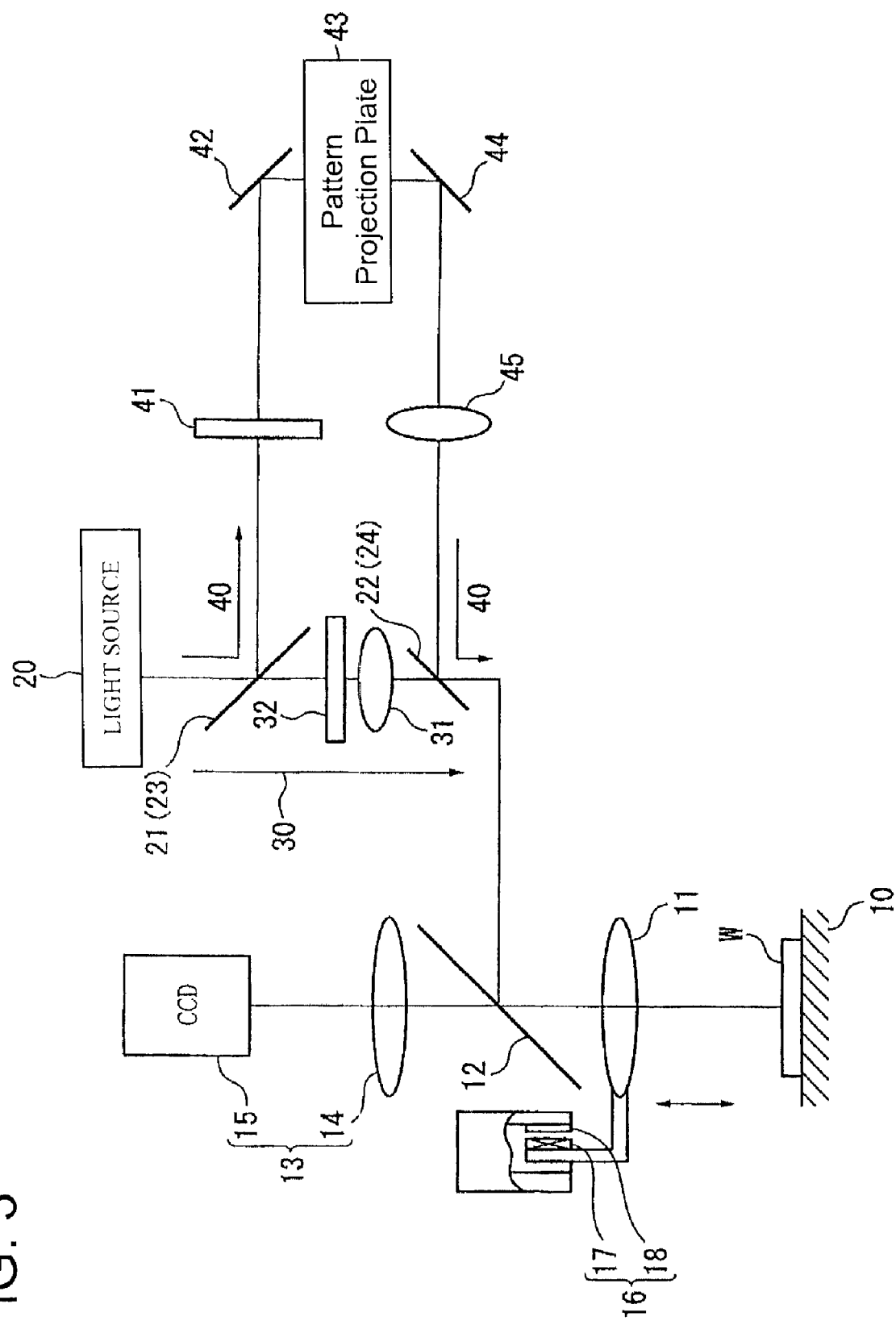
FIG. 3 is an optical system structural view showing an image measuring device according to a second embodiment.

FIG. 3 is an optical system structural view showing an image measuring device according to a second embodiment.

The image measuring device according to the second embodiment differs from that of the first embodiment in that an electronic control shutter 32 is provided in an illumination-optical-system optical path 30. That is, the electronic control shutter 32 is inserted and disposed between an illumination lens 31 and a second beam splitter 23 forming light dividing means 21. The electronic control shutter 32 is similar to the electronic control shutter 41 according to the first embodiment.

According to the second embodiment, since the electronic control shutter 32 is also provided in the illumination-optical-system optical path 30, illumination light can be intercepted during pattern projection. Therefore, during the pattern projection, patterns having high contrast can be obtained, so that focusing can be performed with high precision.

Figure 4:
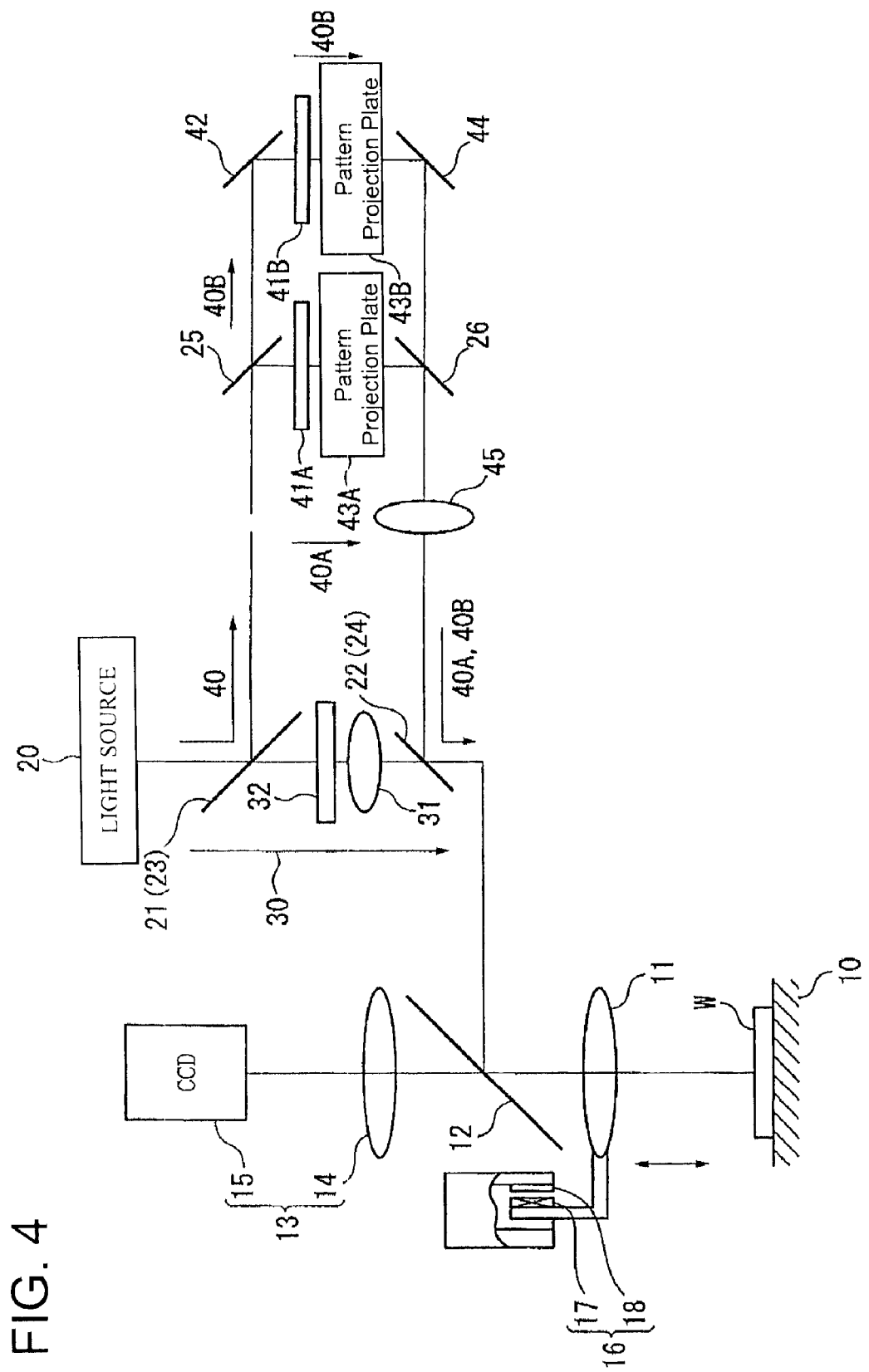
FIG. 4 is an optical system structural view showing an image measuring device according to a third embodiment.
Figure 5:
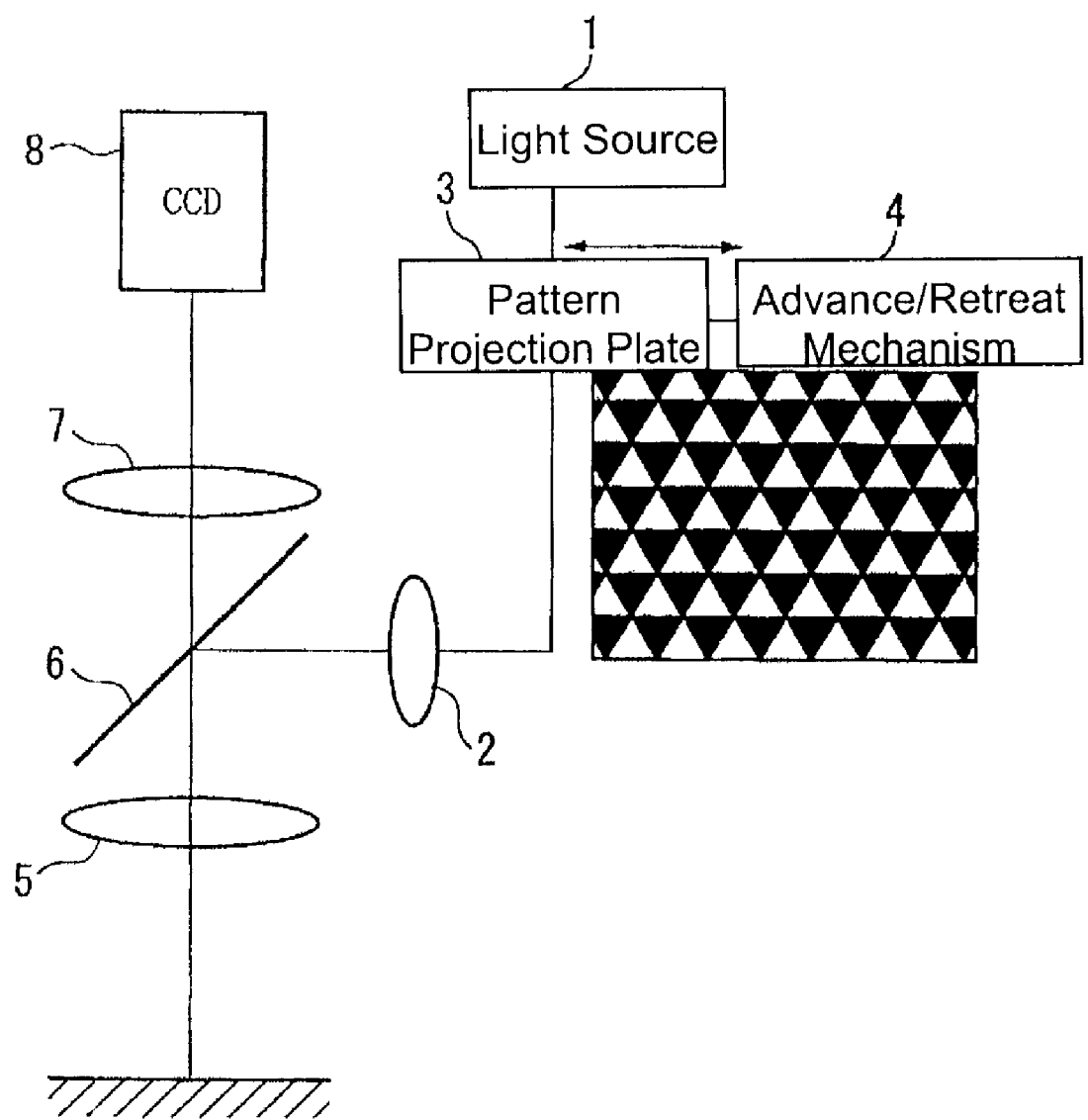
FIG. 5 is an optical system structural view showing a related image measuring device.

FIG. 4 is an optical system structural view showing an image measuring device according to a third embodiment.

The image measuring device according to the third embodiment differs from that of the second embodiment in that it includes a plurality of pattern-projection-optical-system optical paths. That is, the light dividing means 21 includes a second beam splitter 23 and a fourth beam splitter 25. The second beam splitter 23 serves as a light dividing optical element that divides light from a light source 20 into light that takes an illumination-optical-system optical path 30 and light that takes a pattern-projection-optical-system optical path 40. The fourth beam splitter 25 serves as a light dividing optical element that further divides the light divided at the pattern-projection-optical-system optical path 40 into light that takes a first-pattern-projection-optical-system optical path 40A and light that takes a second-pattern-projection-optical-system optical path 40B.

The first-pattern-projection-optical-system optical path 40A is formed as a path extending from the second beam splitter 23 to a third beam splitter 24 through the fourth beam splitter 25, a fifth beam splitter 26, and a projection lens 45.

The second-pattern-projection-optical-system optical path 40B is formed as a path extending from the fourth beam splitter 25 to the third beam splitter 24 through a first mirror 42, a second mirror 44, the fifth beam splitter 26, and the projection lens 45.

A first electronic control shutter 41A and a second electronic control shutter 41B and a first pattern projection plate 43A and a second pattern projection plate 43B, having different patterns formed thereon, are inserted and disposed in the first-pattern-projection-optical-system optical path 40A and the second-pattern-projection-optical-system optical path 40B, respectively.

According to the third embodiment, the first-pattern-projection-optical-system optical path 40A and the second-pattern-projection-optical-system optical path 40B are provided. In addition, the first electronic control shutter 41A and the second electronic control shutter 41B and the first pattern projection plate 43A and the second pattern projection plate 43B, having different patterns formed thereon, are inserted and disposed in the first-pattern-projection-optical-system optical path 40A and the second-pattern-projection-optical-system optical path 40B, respectively. Therefore, it is possible to select the first pattern projection plate 43A or the second pattern projection plate 43B that has the optimal pattern in accordance with the material or the surface state of the measurement object. Consequently, it is possible to further increase an autofocus function.

The autofocus device described herein is not limited to the above-described embodiments, so that the autofocus device includes, for example, various modifications and improvements within the scope that allows the object of the present invention to be achieved.

For example, although the electronic control shutter 41 or the electronic control shutters 41A and 41B (in which a plurality of blades are combined with each other in a circular shape and in which these blades are opened and closed by the driving device) are used in the above embodiments, the autofocus device is not limited thereto. For example, a liquid crystal plate capable of switching between a transmission state or an interception state of light by application or non-application of current may be used.

Further, although the electronic control shutter 41 or the first and second electronic control shutters 41A and 41B are inserted in front of the pattern projection plate 43 or the pattern projection plates 43A and 43B in each of the embodiments, the autofocus device is not limited thereto. The electronic control shutter 41 or the first and second electronic control shutters 41A and 41B may be disposed behind the pattern projection plate 43 or the first and second pattern projection plates 43A and 43B. As long as the electronic control shutter 41 or the first and second electronic control shutters 41A and 41B are disposed in the pattern-projection-optical-system optical path 40 or the first and second pattern-projection-optical-system optical paths 40A and 40B, the electronic control shutter 41 or the first and second electronic control shutters 41A and 41B may be disposed anywhere.

Similarly, although the electronic control shutter 32 is inserted in front of the illumination lens 31, the autofocus device is not limited thereto. The electronic control shutter 32 may be disposed behind the illumination lens 31. As long as the electronic control shutter 32 is disposed in the illumination-optical-system optical path 30, the electronic control shutter 32 may be disposed anywhere.

Further, although the light from one light source 20 is divided by the second beam splitter 23 into light that takes the illumination-optical-system optical path 30 and light that takes the pattern-projection-optical-system optical path 40 or lights that take the pattern-projection-optical-system optical paths 40A and 40B, the autofocus device is not limited thereto. A light source may be provided in each of the illumination-optical-system optical path 30 and the pattern-projection-optical-system optical path 40 or the pattern-projection-optical-system optical paths 40A and 40B.

In the third embodiment, the light from the light source 20 is divided into light that takes the illumination-optical-system optical path 30 and lights that take the first pattern-projection-optical-system optical path 40A and the second pattern-projection-optical-system optical path 40B. However, the light from the light source 20 may be divided into light that takes the illumination-optical-system optical path 30 and lights that take three or more pattern-projection-optical-system optical paths. By this, it is possible to further increase the autofocus function.

Further, although the patterns of the pattern projection plate 43 are triangular patterns, the autofocus is not limited thereto. The patterns may be other types of patterns. For example, as long as the patterns of the pattern projection plate 43 are those that allow detection of an edge of a measurement object, any patterns, such as oblique lattice patterns or wavy patterns, may be used.

The present invention can be applied to an optical measuring device, such as an image measuring device or a microscope, that measures the dimensions and shape of a measurement object while an image of the measurement object is observed with an observation optical system.

What is claimed is:

1. An autofocus device comprising:
an objective lens that converges light at a measurement surface of a measurement object;
an observation optical system capable of observing an image of the measurement object based on the light from the objective lens;
a driving mechanism that displaces the objective lens in an optical axis direction thereof on the basis of a contrast of the image of the measurement object obtained at the observation optical system;
an illumination-optical-system optical path used to illuminate the measurement surface of the measurement object through the objective lens with the light;
a pattern-projection-optical-system optical path,
a light source;
a light divider for dividing light from the light source into light that takes the illumination-optical-system optical path and light that takes the pattern-projection-optical-system optical path; and
a light synthesizer for synthesizing the light from the pattern-projection-optical-system optical path with the light of the illumination-optical-system optical path
wherein a pattern projection plate, having a predetermined pattern formed thereon, a projection lens, and a shutter are provided in the pattern-projection-optical-system optical path, wherein the shutter is movable between an opened position transmitting light and a closed position blocking transmission of light whereby, when a contrast value detected by the observation optical system is low, the shutter is moved from the closed position to the opened position so that the predetermined pattern of the pattern projection plate can be projected onto the measurement surface, thereby increasing the contrast value detected by the observation optical system and permitting focusing of the objective lens on the measurement surface,
wherein the light divider includes a plurality of light dividing optical elements that divide the light from the light source into the light that takes the illumination-optical-system optical path and lights that take a plurality of pattern-projection-optical-system optical paths, and
wherein the pattern projection plate includes a plurality of pattern projection plates and wherein the first shutter includes a plurality of shutters provided in the plurality of the pattern-projection-optical-system optical paths.

2. An autofocus device comprising:
an objective lens that converges light at a measurement surface of a measurement object;
an observation optical system capable of observing an image of the measurement object based on the light from the objective lens;
a driving mechanism that displaces the objective lens in an optical axis direction thereof on the basis of a contrast of the image of the measurement object obtained at the observation optical system;
an illumination-optical-system optical path used to illuminate the measurement surface of the measurement object through the objective lens with the light;
a pattern-protection-optical-system optical path,
a light source;
a light divider for dividing light from the light source into light that takes the illumination-optical-system optical path and light that takes the pattern-projection-optical-system optical path; and
a light synthesizer for synthesizing the light from the pattern-projection-optical-system optical path with the light of the illumination-optical-system optical path;
wherein a pattern projection plate, having a predetermined pattern formed thereon, a projection lens, and a shutter are provided in the pattern-projection-optical-system optical path, wherein the shutter is movable between an opened position transmitting light and a closed position blocking transmission of light whereby, when a contrast value detected by the observation optical system is low, the shutter is moved from the closed position to the opened position so that the predetermined pattern of the pattern projection plate can be projected onto the measurement surface, thereby increasing the contrast value detected by the observation optical system and permitting focusing of the objective lens on the measurement surface;

wherein the shutter is a first shutter, and wherein a second shutter is provided in the illumination-optical-system optical path divided by the light divider;

wherein the light divider includes a plurality of light dividing optical elements that divide the light from the light source into the light that takes the illumination-optical-system optical path and lights that take a plurality of the pattern-projection-optical-system optical paths, and wherein the pattern projection plate includes a plurality of pattern projection plates having different patterns formed thereon, and the first shutter includes a plurality of first shutters and one of the first shutters is provided in each of the plurality of the pattern-projection-optical-system optical paths.

* * * * *